UNITED STATES PATENT OFFICE.

CARLETON ELLIS, OF LARCHMONT, NEW YORK, ASSIGNOR TO ELLIS-FOSTER COMPANY, A CORPORATION OF NEW JERSEY.

COMPOSITION FOR LAYING ROAD-DUST AND HARDENING ROAD-BEDS.

943,667.

Specification of Letters Patent. Patented Dec. 21, 1909.

No Drawing. Application filed April 25, 1909. Serial No. 429,227.

*To all whom it may concern:*

Be it known that I, CARLETON ELLIS, a citizen of the United States, residing at Larchmont, in the county of Westchester and State of New York, have invented certain new and useful Improvements in Composition for Laying Road-Dust and Hardening Road-Beds, of which the following is a specification.

This invention relates to emulsions of oils with aqueous solutions of deliquescent material which are so combined as to be of a substantially neutral character, that is to say, having no deleterious action on metal, wood, leather, varnish, etc., and relates particularly to an emulsion of mineral oil with an aqueous solution of a deliquescent chlorid of an alkaline earth, all as more fully hereinafter set forth and claimed.

Most of the emulsions used in the laying of road dust are composed of oils with soapy material; the latter has always an alkaline reaction due either to the presence of free alkali or to alkali set free by hydrolysis. On account of this alkaline reaction many materials used in the manufacture of vehicles are more or less affected when such emulsions come in contact therewith. Varnish is particularly prone to injury through contact with alkaline materials. The use of oil by itself is furthermore objectionable in that it affects the rubber tires extensively used on vehicles, causing the rubber to soften and deteriorate. It furthermore forms an oily dust which settles in dwellings, and makes the articles with which this dust contacts take on a greasy smeary appearance. Ordinary oil does not penetrate properly into the road surface except in very dry weather. If the road is damp the oil remains on the surface and a great deal of it finds its way to the gutter.

The present invention has for its object the production of a penetrating oily emulsion which may be readily applied, diluted with water to a considerable extent, and which does not have the objectionable properties above mentioned.

It is also the object of this invention to provide a composition which has a cementing and hardening action upon the road surface and the earth, or sub-soil, for some distance below the surface.

With oil alone there is often times formed a very disagreeable mud in frosty weather, and there is also a tendency to the formation of a surface scum or gummy material which flakes off under the abrasive action of traveling vehicles, such as automobiles. The peculiar penetrative properties of the present invention overcome this difficulty and do away with the troublesome crusting heretofore experienced. It also in a large measure overcomes the action of oils upon the hoofs of horses, preventing disease of the hoof and frog, to which horses are now subject when traveling for a considerable period over roads impregnated with ordinary road oils.

In compounding my improved composition, I take preferably mineral oils, such as crude oils, asphaltic oils, or the more refined products, such as paraffin oils, neutral oils, or the various oils obtained from coal or wood, tar, or even the tarry matter obtained in these operations, as well as residuum from the distillation of oils, also various residues or foots obtained in the refining of animal or vegetable oils. As a deliquescent compound I employ preferably the chlorids of calcium or magnesium, or mixtures of these salts, and even may use crude common salt, or the residues obtained in the manufacture thereof, which have more or less deliquescent action. These salts are put into solution in water to make a concentrated liquor. In order to emulsify such aqueous solutions with the oils above mentioned, and at the same time produce a substantially neutral compound, I make use of a proteid emulsifier, non-precipitable by the salt employed. Many proteid compounds, such as, casein or glue, are precipitated by concentrated solutions of inorganic salts. I have found that certain proteid bodies are, however, not so precipitated, and among these I find especially suitable ordinary seamoss, or Irish moss, containing the body carraghenin. Irish moss may be dissolved in water to make a thick syrup or jelly, and calcium chlorid or magnesium chlorid added almost to the saturation point without precipitation of the proteid or loss of viscosity or emulsifying properties.

A suitable composition may be made in this manner by dissolving by heat 250 pounds of Irish moss in 1000 gallons of water, sea water being used if desired, adding thereto 3000 pounds of calcium chlorid of 75% strength, and emulsifying this mixture with 1000 gallons of petroleum oil, preferably at a temperature of 60° or 70° C., although the emulsion may be made in the cold if desired. In making the emulsion, I may agitate in a suitable mixing device, or emulsifier, or may place the materials in a suitable receptacle and pump the liquor from the bottom by means of a force pump back into the top of the receptacle forcing it through a discharge nozzle, so that it may impinge upon the surface of the liquor in the receptacle under considerable pressure. By operating in this manner, a very complete emulsification may be obtained in a short time, so thorough, in fact, that the emulsion may be mixed with a large volume of water and the particles remain suspended for a long period of time, gradually collecting at the surface of the solution in the form of a thin cream without the formation of oily drops. Other emulsifying agents, which however are not as satisfactory, I find in the starches; these do not precipitate as completely in the presence of salts as do casein and similar proteid bodies. The emulsion formed with starch is however not as permanent or complete as in the case of the Irish moss compositions.

It has heretofore been impossible to emulsify calcium solutions and oils in conjunction with soaps or alkaline materials because of the incompatibility of calcium chlorid and soap or alkali, consequently the soap and oil emulsions heretofore produced have been lacking in one important feature, that is, the aqueous material of the emulsions represented merely waste matter adding to the bulk without accomplishing useful results. In the present invention the water of the composition is made the carrier for the deliquescent calcium or magnesium salt, so that when the latter is spread upon the soil it may absorb moisture from the air and keep the road in a moist condition, and at the same time the oil being intimately mixed in an emulsified condition with the calcium chlorid prevents the latter from washing away rapidly, as is the case where calcium or magnesium chlorids alone are used. This gives opportunity for the deliquescent chlorids to act upon the earth's soil, cementing the particles together and forming together with the oil, which undergoes often times a certain degree of oxidation, a firm hard road bed which is free from dust and not easily abraded by rapidly moving vehicles. The composition has no action on varnish, metals, leather or cloth, owing to its complete neutrality. If the wet soil is thrown up by a carriage wheel against clothing it does not adhere to the same degree that ordinary oils or emulsions have been observed to do, and may be washed out of the clothing with much greater ease. The emulsion may be applied in a concentrated form by sprinkling, or otherwise, or may be diluted with water and sprayed over road beds by means of an ordinary watering cart. For this purpose two or three barrels of emulsion may be mixed with five to fifteen barrels of water. Watering carts if desired may be used containing an agitating device, although this is not necessary if the emulsion and water in the cart are well mixed before use.

By the use of oils having antiseptic properties, the combination with magnesium or calcium chlorid gives rise to a very useful antiseptic material which destroys germs of dangerous diseases, etc., and prevents the transmission of disease.

Owing to the peculiar fixative qualities of the present composition it does not throw off an oily dust in the manner which ordinary road oils have been observed to do.

What I claim is:

1. A composition for laying road dust and hardening road beds, comprising an emulsion of oil and calcium chlorid, said composition having a neutral reaction and containing a proteid emulsifier.

2. A composition for laying road dust and hardening road beds, comprising an emulsion of petroleum oil, and a deliquescent salt in aqueous solution, all incorporated by means of a proteid emulsifier.

3. A composition for laying road dust and hardening road beds, comprising mineral oil, a chlorid of an alkaline earth of a deliquescent character, Irish moss and water.

4. A composition for laying road dust and hardening road beds, consisting of mineral oil, calcium chlorid, Irish moss and water.

5. A composition for laying road dust and hardening road beds, comprising an emulsion consisting of about equal parts of oil and a concentrated solution of calcium chlorid thickened with Irish moss, said composition being in the form of an emulsion.

6. A composition for laying road dust and hardening road beds, prepared from calcium chlorid, Irish moss, water and heavy petroleum oil.

7. A composition for laying road dust and hardening road beds consisting of 250 pounds of Irish moss, 1000 gallons of petroleum oil, 1000 gallons of water and 3000 pounds of calcium chlorid of 75%.

In testimony whereof I have affixed my signature in presence of two witnesses.

CARLETON ELLIS.

Witnesses:
NATHANIEL L. FOSTER,
HENRIETTA BERKWITZ.